(12) United States Patent
Patzelt et al.

(10) Patent No.: US 8,001,309 B2
(45) Date of Patent: Aug. 16, 2011

(54) METHOD AND SYSTEM FOR GROUPING INTERRUPTS FROM A TIME-DEPENDENT DATA STORAGE SYSTEM

(75) Inventors: Christoph Patzelt, Assling (DE); Vladimir Litovtchenko, Munich (DE); Dirk Moeller, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 134 days.

(21) Appl. No.: 12/305,328

(22) PCT Filed: Jun. 22, 2006

(86) PCT No.: PCT/EP2006/063473
§ 371 (c)(1),
(2), (4) Date: Dec. 17, 2008

(87) PCT Pub. No.: WO2007/147441
PCT Pub. Date: Dec. 27, 2007

(65) Prior Publication Data
US 2009/0282179 A1    Nov. 12, 2009

(51) Int. Cl.
*G06F 13/24* (2006.01)
(52) U.S. Cl. .................. 710/261; 710/266
(58) Field of Classification Search .......... 710/260–269, 710/52–61
See application file for complete search history.

(56) References Cited

U.S. PATENT DOCUMENTS

| | | | |
|---|---|---|---|
| 6,005,796 A | 12/1999 | Sywyk et al. | |
| 6,141,703 A | 10/2000 | Ding et al. | |
| 6,185,640 B1 | 2/2001 | Ross | |
| 6,209,047 B1 | 3/2001 | Kim | |
| 6,237,066 B1 | 5/2001 | Pan et al. | |
| 6,243,769 B1 | 6/2001 | Rooney | |
| 6,256,699 B1 * | 7/2001 | Lee ............................. | 710/310 |
| 6,263,384 B1 | 7/2001 | Yanase | |
| 6,816,929 B2 | 11/2004 | Ueda | |
| 7,539,791 B2 | 5/2009 | Wu et al. | |
| 2001/0056513 A1 | 12/2001 | Ueda | |
| 2003/0105798 A1 | 6/2003 | Kim et al. | |
| 2003/0172231 A1 | 9/2003 | Ebergen | |
| 2004/0117532 A1 | 6/2004 | Bennett et al. | |
| 2004/0208181 A1 | 10/2004 | Clayton et al. | |
| 2005/0091427 A1 | 4/2005 | Yoshida et al. | |
| 2005/0157709 A1 | 7/2005 | Lin | |
| 2008/0140949 A1 | 6/2008 | Hartwich et al. | |

(Continued)

FOREIGN PATENT DOCUMENTS
EP    1624620 A    2/2006

OTHER PUBLICATIONS

Stranko; "Enhanced Sensor Tracking" IBM Technical Disclosure Bulletin, IBM Corp., New York, USA 1982.

(Continued)

*Primary Examiner* — Raymond N Phan

(57) ABSTRACT

A method of grouping interrupts from a time-dependent data storage means in accordance with the types of the interrupts, the method comprising the steps of providing each part of the data storage means with an indicator of an event associated with the part, generating interrupts upon the occurrence of events in different parts of the data storage means, allocating interrupts associated with substantially the same part of the data storage means to a same processing means.

20 Claims, 4 Drawing Sheets

U.S. PATENT DOCUMENTS

| | | | |
|---|---|---|---|
| 2008/0162763 A1* | 7/2008 | Bney-Moshe | 710/263 |
| 2008/0189451 A1 | 8/2008 | Isono et al. | |
| 2008/0256320 A1 | 10/2008 | Hartwich et al. | |
| 2008/0282041 A1 | 11/2008 | Hartwich et al. | |
| 2009/0083466 A1* | 3/2009 | Hartwich et al. | 710/112 |
| 2009/0119425 A1 | 5/2009 | Litovtchenko et al. | |
| 2009/0150607 A1 | 6/2009 | Krantz et al. | |
| 2009/0300254 A1 | 12/2009 | Newald et al. | |
| 2009/0327545 A1 | 12/2009 | Litovtchenko et al. | |
| 2010/0064082 A1* | 3/2010 | Ihle et al. | 710/106 |
| 2010/0161834 A1 | 6/2010 | Newald et al. | |

OTHER PUBLICATIONS

ST Microelectronics; "ST10X167/ST10F168 CAN Interrupt Drivers"; Application Note, 1998.

Non-Final Office Action mailed Sep. 28, 2010 for U.S. Appl. No. 12/304,197, 8 pages.

Notice of Allowance mailed Mar. 28, 2011 for U.S. Appl. No. 12/304,197, 7 pages.

\* cited by examiner

METHOD AND SYSTEM FOR GROUPING INTERRUPTS FROM A TIME-DEPENDENT DATA STORAGE SYSTEM

FIELD OF THE INVENTION

This invention relates to a method and system of grouping interrupts, and in particular, a method and system of grouping interrupts from a time-dependent data storage means.

BACKGROUND OF THE INVENTION

FlexRay is a communication protocol developed by a consortium of automotive manufacturers and semiconductor companies to provide a distributed control and communication system for automotive applications.

FlexRay systems comprise a plurality of buffers, wherein these buffers are configured as double buffers. Double buffers are prone to blocking which limit their use for storing and transmitting data from real-time applications. Solutions to this limitation are constantly being sought.

United States Patent Application US2004208181 describes a network computer system in which the computers transmit messages over virtual circuits established thereamong, wherein the messages are transmitted in a round-robin scheduling arrangement. However, US2004208181 does not describe the dedicated bus systems of the FlexRay protocol. Furthermore, US2004208181 does not describe the transmission of data from real-time applications. Similarly, US2004208181 does not describe the discarding of obsolete frames.

US Patent Application US20050091427 describes an integrated circuit device having a send/receive macro for serially transferring addresses and data to or from an external device via a serial transfer bus. In this case, the host CPU interrupt load is decreased by implementing a block which controls data transmission and monitors the data transmission status. This block has its own FIFO buffer where it stores data provided by the host CPU. The host is interrupted only if data transmission was not acknowledged. However, in contrast with the present invention, the invention described in US20050091427 utilizes FIFO therefore no transmission done event is sent to the host, but only FIFO is empty interrupt or the data is not acknowledged.

US Patent Application US20050157709 describes a multi-queue single-FIFO scheme for quality of service oriented communication. In this case, the host CPU interrupt load is reduced by implementing an arbiter which maintains data transmission operations on the physical medium from the connected Multi-queue single-FIFO. However, in contrast with the present invention, the invention described in US20050157709 relates to an architecture based on a FIFO. In particular, it does not relate to the double buffers of the present invention.

Similarly, "Programming ST10X167/ST10F168 CAN interrupt drivers" Application Note, 1998 STMicroelectronics, discusses host CPU programming approaches utilizing single buffers for transmission which has combined event and state interrupts for transmit buffers in a CAN communication system. However, this document does not relate to FIFO systems or double buffers.

SUMMARY OF THE INVENTION

The present invention provides a method and system for transmitting a datum and grouping interrupts as provided in the accompanying Claims.

BRIEF DESCRIPTION OF THE DRAWINGS

FIG. 1b is a block diagram of an electronic control unit shown in FIG. 1a;

DETAILED DESCRIPTION OF THE PREFERRED EMBODIMENTS

In the following description, the FlexRay protocol is used for example purposes only, to demonstrate the operation of the method and system for transmitting a datum in accordance with the invention. In particular, it will be understood that the present invention should not be construed as being limited to the FlexRay protocol.

Figure 1A:
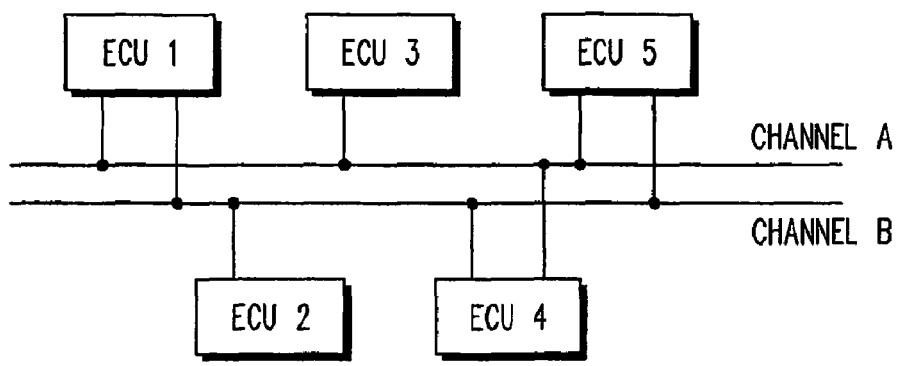
FIG. 1a is a block diagram of a topology of electronic control units in a FlexRay system.
Figure 1B:
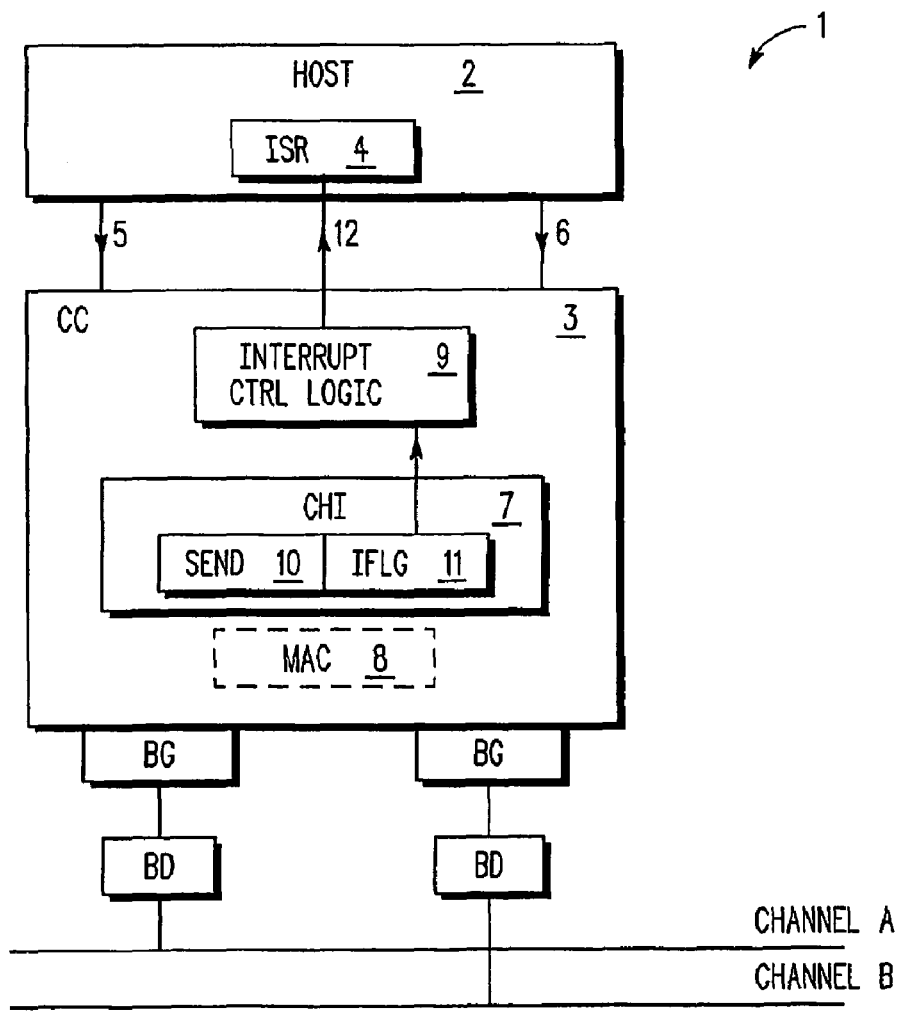

Referring to FIG. 1a, a FlexRay system comprises several electronic control units ($ECU_1$-$ECU_5$) connected to one or two communication channels (channel A and/or channel B). Referring to FIG. 1b, an ECU 1 comprises inter alia a host processor 2, a communication controller 3, a bus driver (BD) and, optionally, a bus guardian (BG). The host processor 2 comprises an interrupt services routine or embedded software 4 which services interrupts from the communication controller 3 independently of the interrupt type.

In use, the host processor 2 transmits data 5 and configuration information 6 to the communication controller 3, which transmits the data 5 onto the communication channel(s) (channel A and/or channel B). To this end, the communication controller 3 comprises a controller host interface (CHI) 7, a media access controller (MAC) 8 and an interrupt control logic unit 9. The controller host interface 7 comprises a plurality of buffers that include at least one send buffer 10. The send buffer(s) 10 are each provided with an interrupt generator 11 and are connected to a one or more host processor interrupt lines 12.

Figure 2:
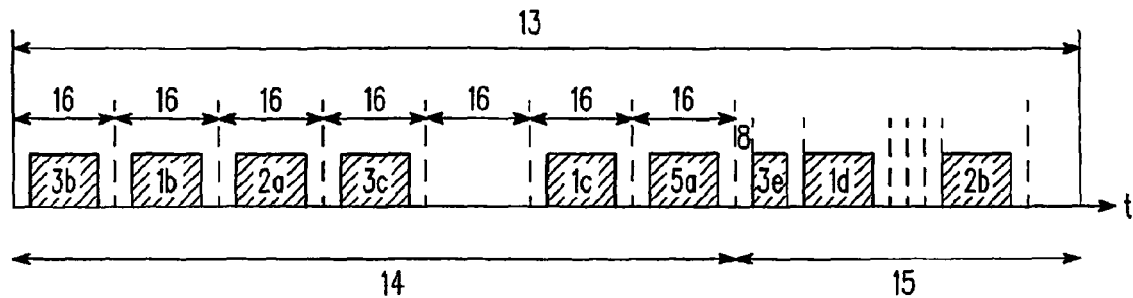
FIG. 2 is a block diagram of the timing scheme used for transmitting messages in the FlexRay system.

Referring to FIG. 2, the communication channels support data transfer rates up to 10 Mbits/sec and enable communication in recurring communication cycles. A communication cycle 13 comprises a static segment 14 and a dynamic segment 15. The static segment 14 employs time division multiple access (TDMA) to restrict the ability of an ECU to transmit data to specifically designated time intervals known as time slots 16. Messages are communicated from ECUs in the form of data frames, wherein only a single frame may be transmitted during a given time slot 16.

Returning to FIG. 1b, in use, the host processor 2 informs the communication controller 3 of the time slots it has been allocated. At each time slot, the media access controller 8 checks whether an ECU is allowed to transmit a message. If an ECU is allowed to transmit a message, the media access controller 8 imports data from the send buffer(s) 10 and generates a frame therefrom. The media access controller 8 then transmits the frame on the communication channels (channel A and/or channel B). Whilst waiting for the next available time slot, data is stored in the send buffer(s) 10. To this end, a send buffer 10 can store up to 254 bytes of payload data.

Figure 3:
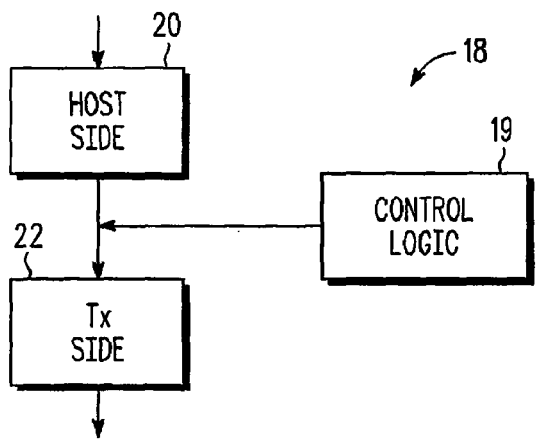
FIG. 3 is a block diagram of a traditional double buffer arrangement in a FlexRay system.

The host processor 2 can configure some send buffer(s) 10 to be double buffers. Referring to FIG. 3 in combination with FIG. 1b, a conventional double buffer 18 can be considered as a FIFO buffer of depth two, wherein the buffer 18 is divided into two partial buffers of equal length which operate under the control of a control logic unit 19. The two partial buffers are respectively known as a host-side buffer 20 and a transmit-side buffer 22. Once data have been written to a transmit-side buffer 20, the data are no longer under the control of the host processor 2. For example, the host processor 2 cannot retrieve or remove data written to the transmit-side buffer 22 until it is transmitted by the communication controller 3 on the communication channels (channel A and/or channel B).

As a result, data most recently acquired by an ECU may not be transmitted thereby. Instead, the only data transmitted is that loaded into the transmit-side of the double buffer(s) (i.e. send buffer(s) 10) at a given time slot. However, in some cases (e.g. real-time measuring systems) it is desirable to transmit the data most recently acquired by the host processor 2. This is particularly problematic if a host processor 2 acquires data faster than the communication controller 3 can transmit the data from the double buffer(s) (i.e. send buffer(s) 10).

A send buffer 10 also stores data provided by the communication controller 3 for transmission to the host processor 2. This data comprises information about the transmission process and status information about the time slot in which data was transmitted. The data is stored in inter alia the interrupt generator 11. In use, each send buffer(s) 10 informs the host processor 2 about its event and state changes by asserting its interrupt generator 11.

More specifically, during a transmission, the communication controller 3 generates two types of interrupts, namely an event interrupt (which indicates that a transmission is finished) and a state interrupt (which indicates that the send buffer 10 requires update from the host processor 2). In use, both types of interrupt are combined into an interrupt signal which is transmitted to the host processor 2. On receipt of an interrupt signal, the interrupt service routine 4 must determine the cause of the interrupt signal. In other words, the interrupt service routine or embedded software 4 must determine whether a particular interrupt signal comprises a state interrupt or an event interrupt.

A. First Embodiment

Non-Blocking Double Buffer

Figure 4:
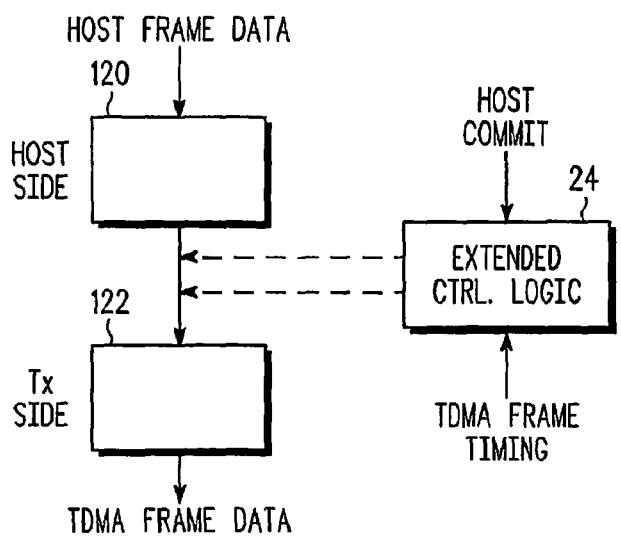
FIG. 4 is a block diagram of a non-blocking double buffer in accordance with the first embodiment of the invention given by way of example.

Referring to FIG. 4, the non-blocking double buffer in accordance with the present invention comprises a host-side buffer 120, a transmit-side buffer 122 and an extended control logic unit 24. The extended control logic unit 24 starts working each time new data are stored in the host-side buffer 120.

Depending on the state of the transmit-side buffer 122, new data may be written into it, replacing previously stored data that have not been sent already. However, if the transmit-side buffer 122 is transmitting data at the time, the new data is not written thereto at that moment. Instead, the transmit-side buffer 122 is updated immediately after the transmission has finished.

Figure 5:
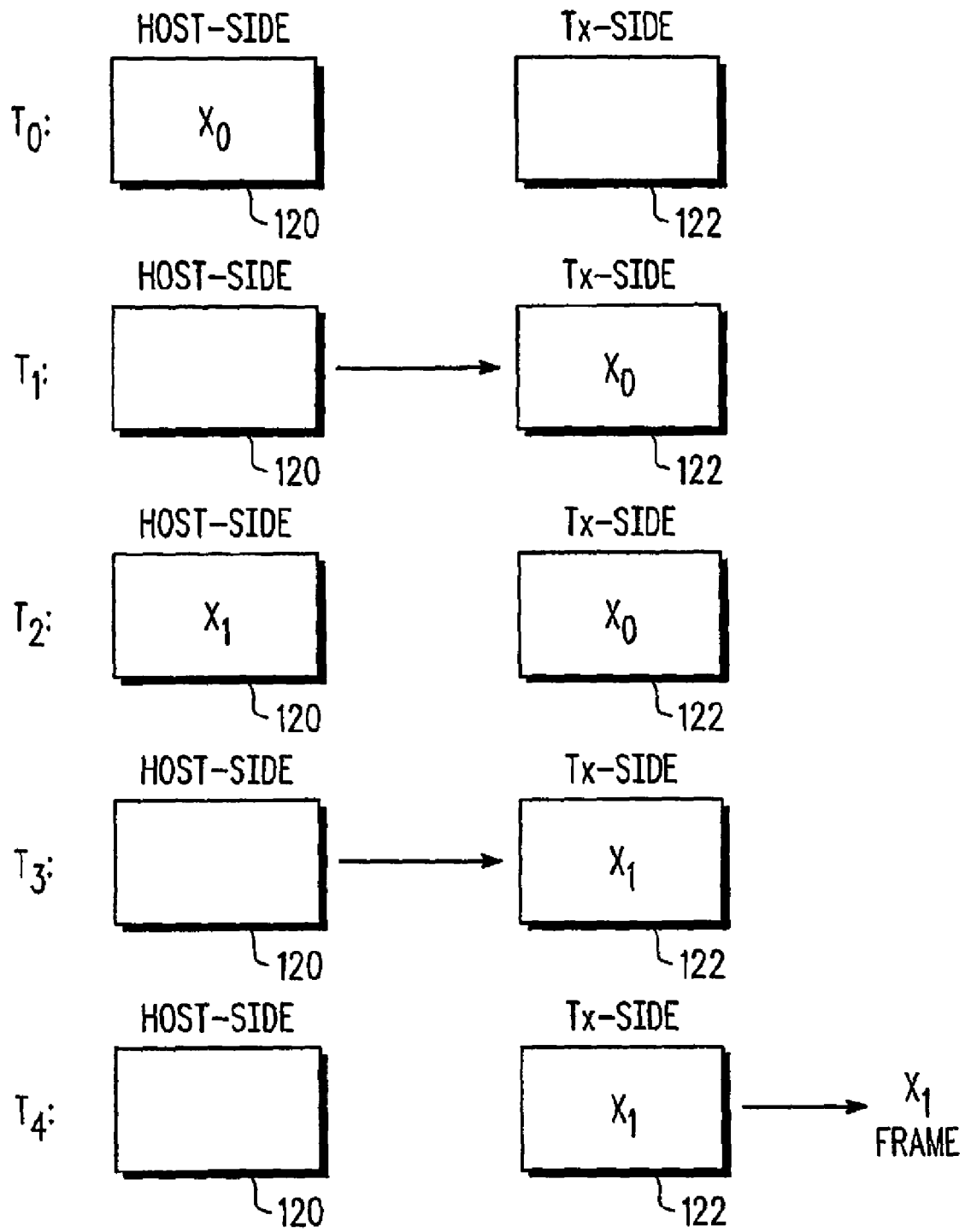
FIG. 5 is a block diagram showing the timing of the processes occurring in the non-blocking double buffer of FIG. 4 in accordance with one embodiment of the invention given by way of example.

Referring to FIG. 5, consider a series of data measurements $X_0$-$X_N$ acquired during a same time slot of a communication cycle. At a first time $T_0$, a data measurement $X_0$ is stored in the host-side buffer 120 (and the transmit-side buffer 122 is empty). At a second time thereafter $T_1$, the data measurement $X_0$ is transferred to the transmit-side buffer 122. At the next time $T_2$, a new data measurement $X_1$ is stored in the host-side buffer 120.

In a prior art double buffer, if the above situation occurred, since the data measurements $X_0$ and $X_1$ were acquired during the same communication cycle time slot, $X_0$ would not been transmitted from the transmit-side buffer 122 at the time $X_1$ was acquired. Further, $X_0$ could not be removed from the transmit-side buffer 122 and must be retained therein until the next available transmission time slot. Thus, in effect, the transmission of the most recent data measurement $X_1$ at the next available time slot is blocked, insofar as $X_1$ cannot be placed in the transmit-side buffer 122 instead of $X_0$.

However, with the extended control logic unit 24 of the present invention, at later time $T_3$, $X_1$ is transferred from the host-side buffer 120 to the transmit-side buffer 122. Thus, the transmission of measurement data $X_1$ is no longer blocked, so that, at later time $T_4$ (i.e. at the next available time slot), a frame (comprising the most recently acquired measurement data $X_1$) is transmitted from the ECU.

The host processor can store (in the transmit side buffer 120) an arbitrary number of new data measurements that replace a previously stored data measurement until the next allocated transmission time slot. However, if a one or more data measurements are acquired in the time interval between allocated time slots, the present invention transmits only the most recently acquired data measurement.

Accordingly, the present invention is an extension of the FIFO concept of traditional double-buffer systems, which enables the most recently acquired data to be transmitted in a specific time slot, regardless of how many messages have been stored in the send buffer since the last transmission. Thus, the present invention enables multiple storages of frames by a host processor independently of the TDMA timing of the FlexRay protocol.

As a result, the present invention allows the complete decoupling of measurement systems etc. from the TDMA timing mechanism of the FlexRay protocol. The present invention shifts the burden of synchronising data transmission with TDMA timing from the host processor to the double-buffer control logic.

Accordingly, the present invention is particularly useful in real-time systems that generate measurement data at a rate that differs from the TDMA timing of the FlexRay protocol. The present invention is particularly useful insofar as it avoids the need for special adaptations to the FlexRay system to accommodate real-time applications running on the host processor.

B. Second Embodiment

Grouping Interrupts According to their Interrupt Type

In time-critical applications, it is desirable to reduce the load of a host processor by grouping interrupts according to their source. In effect, separating event and state change interrupts decreases the amount of processing an interrupt service routine (ISR) must perform on the interrupt signal, since such grouping enables the host processor to use specific interrupt processing routing or embedded software dedicated to a particular interrupt type.

Figure 6:
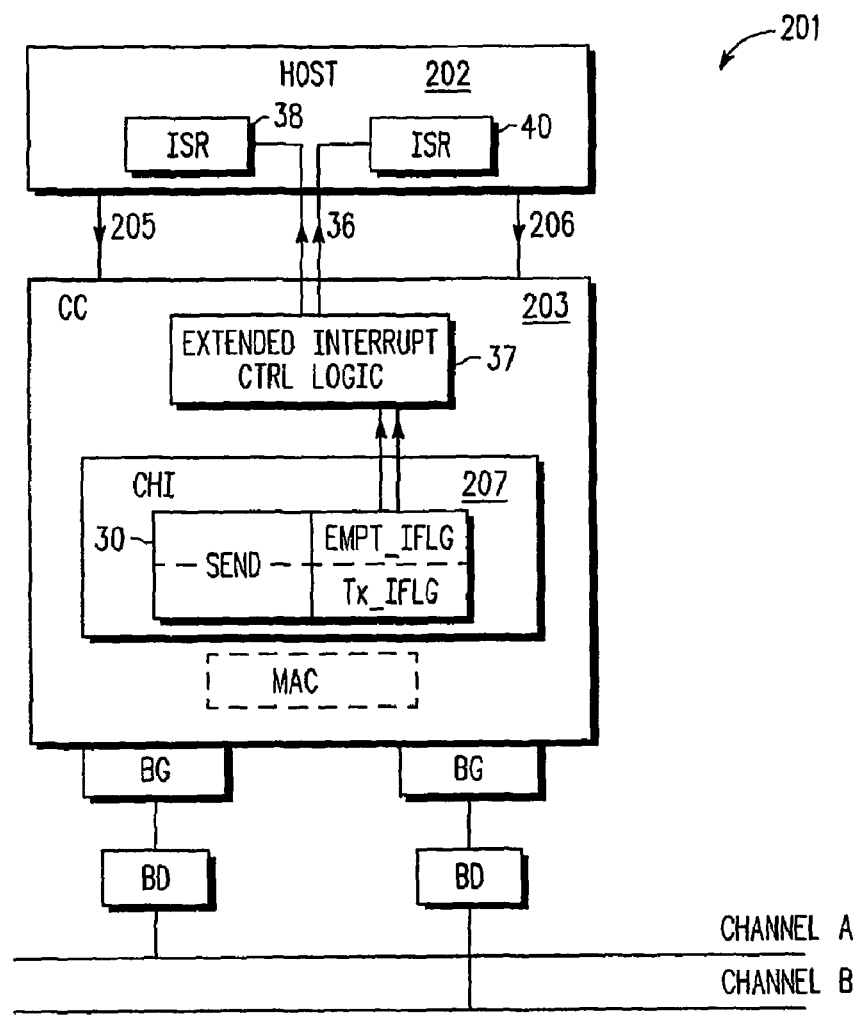
FIG. 6 is a block diagram of an ECU in accordance with the second embodiment of the invention given by way of example.

Referring to FIG. 6, an ECU 201 employing the system for grouping interrupts comprises a host processor 202 and a communication controller 203 as before. The communication controller 203 comprises a controller host interface 207 and at least one send buffer 30 that has been configured as a double buffer.

Figure 7:
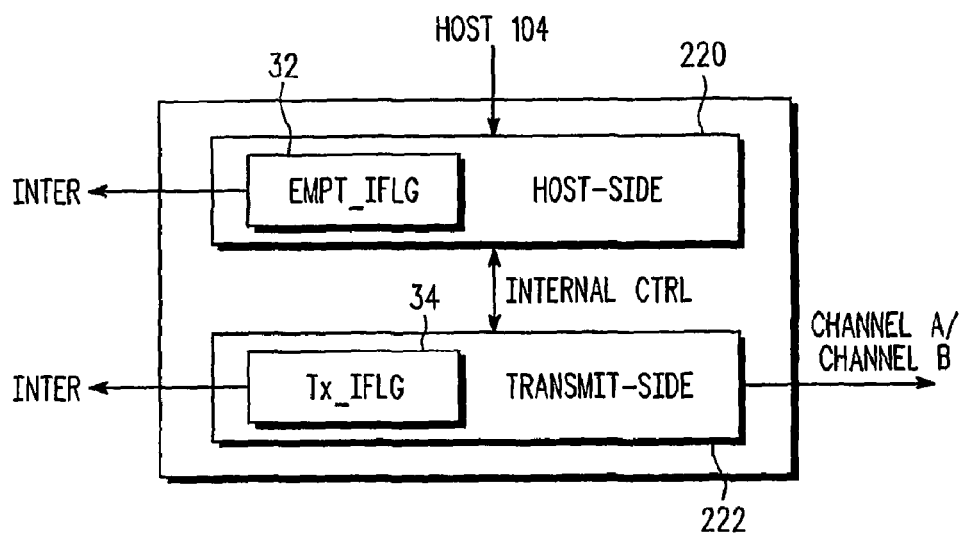
FIG. 7 is a block diagram of a double-buffer in accordance with the second embodiment of the invention given by way of example.

Referring to FIG. 7 in combination with FIG. 6, the host-side buffer 220 and the transmit-side buffer 222 are each provided with their own interrupt generator bits 32, 34. The interrupt generator bits 32, 34 are distinct and have different functions. This contrasts with prior art systems in which the interrupt functions of the host-side buffer and the transmit-side buffer, are combined into a single interrupt generator bit. In keeping with this principle, the interrupt generator bits 32, 34 are connected by one or more host processor interrupt lines 36 (through an extended interrupt control logic unit 37) to a one or more interrupt services routines 38, 40 in the host processor 202.

The interrupt generator bit 32 for the host-side buffer 220 is an Empt_IFLG. In use, this flag bit does not necessarily cause an interrupt (because it could be masked out). However, if the interrupt generator bit 32 is asserted and its utilization as an interrupt source is enabled, it generates an interrupt which indicates to the host processor 202 that the host-side buffer 220 requires updating by the host processor 202. Such need for updating occurs when:

(a) the send buffer 30 has just been initialized
(i.e. so it holds no data to be transmitted); or
(b) the communication controller 203 has
delivered a frame from the host-side buffer 220 to the transmit-side buffer 222, so that host processor 202 can now write new data to the host-side buffer 220; or, optionally,
(c) the data transmission status of the send
buffer 30 was updated by the communication controller 203.

The interrupt generator bit 34 for the transmit-side buffer 222 is a Tx_IFLG bit which in use does not necessarily cause an interrupt (because it could be masked out). However, when asserted and its utilization as an interrupt source is enabled, the interrupt generator bit 34 generates an interrupt which indicates to the host processor 202 that the data in the transmit-side buffer 222 was transmitted onto the communication channels (channel A and channel B) and the communication controller 203 has updated the data transmission status fields of the double buffer 30.

The extended interrupt control logic block 37 receives the interrupts (generated by the asserted interrupt generator bits 32, 34) and groups the interrupts according to their type. This grouping is performed in accordance to the origin of the interrupt (i.e. whether it is from the host-side or transmit-side of the double buffer 30). The grouped interrupts are transmitted to the host processor 202 where they can be processed by ISRs or embedded software 38, 40 so that each ISR or embedded software 38, 40 processes the interrupts from only one group. This enables the host to dedicate ISR or embedded software 38, 40 for processing the interrupts of that group.

Thus, the interrupt grouping scheme of the present invention enables the host processor 202 to use interrupt processing routines dedicated to a particular interrupt type. The present invention also decreases the number of interrupt services routine instructions for the host processor 202 embedded software.

Furthermore, the interrupt grouping scheme of the present invention provides the possibility of tracking bus events and transmitting same to the host processor during a transmission. Similarly, the present invention enables repetitive transmission of the same data stored in the send buffer 30 in several communication cycles whilst tracking the events.

Modifications and alterations may be made to the above without departing from the scope of the invention.

The invention claimed is:

1. A method of grouping interrupts of one or more types for real time applications data from a data storage system in accordance with the types of the interrupt, said data storage system comprising a first part and a second part, said data storage system being able to send data coming from a host processor to one or more communication channels and to send interrupts to the host processor, the method comprising:
providing each part of the data storage system with an indicator of an event associated with the part;
generating interrupts upon the occurrence of events in different parts of the data storage system;
allocating interrupts associated with the same part of the data storage system to a same processing system; and
wherein generating interrupts comprises generating a first type of interrupt to require updated data from the host processor and comprising generating a second type of interrupt to indicate to the host processor finalization of data transmission to the communication channel.

2. The method of claim 1, wherein the method is operated within a time division multiple access (TDMA) protocol.

3. The method as claimed in claim 1, wherein the method is operated within a communication protocol such as the FlexRay (trademark) protocol.

4. The method as claimed in claim 2, wherein the method is operated within a communication protocol such as the FlexRay (trademark) protocol.

5. An interrupt grouping system for a data storage system, comprising:
an interrupt generator to generate first interrupts based on a first indicator of a first event in a host-side of a double buffer of the data storage system, and to generate second interrupts based on a second indicator of a second event in a transmit-side of the double buffer; and
an extended interrupt control logic block to allocate interrupts associated with the same part of the data storage system to a same processing unit.

6. The interrupt grouping system as claimed in claim 5 wherein the second indicator for the transmit-side of the double buffer indicates that the data in the transmit-side has been transmitted.

7. The interrupt grouping system as claimed in claim 6 wherein the first indicator for the host-side of the double buffer indicates that the host-side requires updating.

8. The interrupt grouping system as claimed in claim 5 wherein the data storage system transmits data in accordance with a time division multiple access (TDMA) protocol.

9. The interrupt grouping system as claimed in claim 5 wherein the data storage system transmits data in accordance with a communication protocol such as the FlexRay (trademark) protocol.

10. The interrupt grouping system as claimed in claim 6 wherein the data storage system transmits data in accordance with a time division multiple access (TDMA) protocol.

11. The interrupt grouping system as claimed in claim 7 wherein the data storage system transmits data in accordance with a time division multiple access (TDMA) protocol.

12. The interrupt grouping system as claimed in claim 6 wherein the data storage system transmits data in accordance with a communication protocol such as the FlexRay (trademark) protocol.

13. The interrupt grouping system as claimed in claim 7 wherein the data storage system transmits data in accordance with a communication protocol such as the FlexRay (trademark) protocol.

14. The interrupt grouping system as claimed in claim 8 wherein the data storage system transmits data in accordance with a communication protocol such as the FlexRay (trademark) protocol.

15. An interrupt grouping system for a data storage system, comprising:
    a host-side buffer of a double buffer of the data storage system;
    a transmit-side buffer of the double buffer;
    a first interrupt generator bit of the host-side buffer, the first interrupt generator bit to generate first interrupts upon an occurrence of a first event in the host-side buffer;
    a second interrupt generator bit of the transmit-side buffer, the second interrupt generator bit to generate second interrupts upon the occurrence of a second event in the transmit-side of the data storage system; and
    an extended interrupt control logic block in communication with the first interrupt generator bit and with the second interrupt generator bit, the extended interrupt control logic block to allocate the first interrupts associated with the host-side buffer in a first interrupt service routine of a processor, and to allocate the second interrupts associated with the transmit-side buffer in a second interrupt service routine of the processor.

16. The interrupt grouping system of claim 15 wherein the first interrupt generator bit the host-side of the double buffer indicates that the host-side requires updating.

17. The interrupt grouping system of claim 15 wherein the second interrupt generator bit of the transmit-side of the double buffer indicates that data in the transmit-side has been transmitted.

18. The interrupt grouping system of claim 15 wherein the first interrupt service routine of the processor processes interrupts only from the first interrupt generator bit, and the first interrupt service routine of the processor processes interrupts only from the second interrupt generator bit.

19. The interrupt grouping system of claim 15 wherein the data storage system transmits data in accordance with a time division multiple access (TDMA) protocol.

20. The interrupt grouping system of claim 15 wherein the data storage system transmits data in accordance with a communication protocol such as the FlexRay (trademark) protocol.

* * * * *